(12) United States Patent
Narita et al.

(10) Patent No.: US 8,107,148 B2
(45) Date of Patent: Jan. 31, 2012

(54) CURVATURE CORRECTION DEVICE, OPTICAL SCANNING UNIT, AND IMAGE FORMING APPARATUS

(75) Inventors: Susumu Narita, Kawasaki (JP); Keiichi Serizawa, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 607 days.

(21) Appl. No.: 12/216,187

(22) Filed: Jul. 1, 2008

(65) Prior Publication Data

US 2009/0009836 A1    Jan. 8, 2009

(30) Foreign Application Priority Data

Jul. 2, 2007   (JP) .................................. 2007-174458
Jan. 24, 2008  (JP) .................................. 2008-014063

(51) Int. Cl.
  *G02B 26/08*  (2006.01)
(52) U.S. Cl. .................................. 359/207.11; 347/257
(58) Field of Classification Search .... 359/196.1–226.3; 347/224, 256–263
See application file for complete search history.

(56) References Cited

U.S. PATENT DOCUMENTS

2004/0125193 A1 *  7/2004  Kubo ............................ 347/233
2004/0190096 A1    9/2004  Takase
2006/0103906 A1    5/2006  Sato et al.
2006/0209375 A1    9/2006  Serizawa
2007/0098460 A1    5/2007  Serizawa

FOREIGN PATENT DOCUMENTS

| EP | 1780566     | 5/2007 |
| JP | 2002-148551 | 5/2002 |
| JP | 2004-191847 | 7/2004 |
| JP | 2006-017881 | 1/2006 |

OTHER PUBLICATIONS

European Office Action dated Sep. 15, 2009.

* cited by examiner

*Primary Examiner* — Jennifer L. Doak
(74) *Attorney, Agent, or Firm* — Harness, Dickey & Pierce, P.L.C.

(57) ABSTRACT

A curvature correction device used in an optical scanning unit includes a holder and a pushing unit. The optical scanning unit includes a light beam emitter to emit a light beam, a deflection unit to deflect the light beam in a main scanning direction, and a reflection mirror to reflect the light beam. In at least one embodiment, the curvature correction device includes a holder and a pushing unit. The holder holds the reflection mirror in a state in which the reflection mirror is forcibly bent in a first direction. The pushing unit pushes the reflection mirror held by the holder to bend the reflection mirror in a second direction opposite the first direction. The curvature correction device corrects the curvature of the main scanning line by adjusting an amount at which the pushing unit pushes the reflection mirror. The holder has a stiffness larger than the reflection mirror.

16 Claims, 13 Drawing Sheets

CURVATURE CORRECTION DEVICE, OPTICAL SCANNING UNIT, AND IMAGE FORMING APPARATUS

PRIORITY STATEMENT

The present patent application claims priority under 35 U.S.C. §119 from Japanese Patent Application Nos. 2007-174458, filed on Jul. 2, 2007, and 2008-014063, filed on Jan. 24, 2008 in the Japan Patent Office, the entire contents of each of which are hereby incorporated herein by reference.

BACKGROUND

1. Field

At least one embodiment of the present invention generally relates to a curvature correction device that corrects a curvature of a main scanning line in an optical scanning unit that optically scans a plurality of scanning targets, an optical scanning unit using the curvature correction device, and/or an image forming apparatus using the optical scanning unit.

2. Description of the Background

Image forming apparatuses are used as copiers, facsimile machines, printers, and multi-functional devices combining several of the foregoing capabilities. Certain types of image forming apparatuses such as laser-beam printers, digital copiers, and laser facsimile machines optically scan a latent-image bearing member such as a photoconductor with a light beam generated based on image information to form a latent image on the latent-image bearing member. Such image forming apparatuses typically have an optical scanning unit including a light source such as a laser diode, a deflection unit including a polygon mirror, an fθ lens, and a reflection mirror. The light beam emitted from the light source is deflected by the deflection unit in a main scanning direction of the optical scanning unit, converged by the fθ lens, and reflected by the reflection mirror toward a surface of the latent-image bearing member.

Such optical scanning unit may have a subtle distortion due to manufacturing errors of its optical components and/or support members. Alternatively, such optical components and support members may be deformed by heat of a motor during optical scanning operation. Further, such optical components and support members may have assembling errors. Such distortion, heat deformation, and/or assembling errors may curve a main scanning line on the surface of the latent image bearing member, thereby preventing a desired image from being normally produced.

Such curvature of the main scanning line may be resulted from the accumulation of tolerances including a structural distortion, heat deformation, and/or assembling errors of components of the optical scanning unit. As a result, the amount or direction of curvature may vary depending on products of the optical scanning unit. In order to perform optical scanning operation properly, it is necessary to correct such curvature of main scanning line on the surface of the latent-image bearing member even when the main scanning line is curved in a direction toward any side of upstream and downstream sides with respect to a sub-scanning direction of the optical scanning unit, that is, a moving direction of the surface of the latent-image bearing member.

In view of the above-described situation, Japanese Patent Application Laid-Open No. 2006-17881 proposes an optical scanning unit. The optical scanning unit has a curvature correction device capable of correcting the curvature of main scanning line even if the main scanning line is curved toward any side of upstream and downstream sides with respect to the sub-scanning direction. The curvature correction device uses a holder to hold a reflection mirror in such state that the reflection mirror is forcibly curved or bent in a thickness direction of the reflection mirror. The curvature correction device also uses an adjuster of a pushing member to push the reflection mirror held in such state, thereby providing a force for bending the reflection mirror in a direction opposite to the direction in which the reflection mirror is forcibly bent by the holder. In such configuration, a slight push of the reflection mirror by the pushing member can reduce the amount at which the reflection mirror is forcibly bent by the holder.

A further push of the reflection mirror may bend the reflection mirror in a direction opposite the direction in which the reflection mirror is bent at the initial state. Thus, such curvature correction device capable of bending the reflection mirror toward any of the upstream and downstream sides may correct the curvature of the main scanning line by countering the curvature of the main scanning line at the initial stated with the bend of the reflection mirror in the direction opposite the forcibly bent direction.

However, when the inventors of the present disclosure built a prototype of such curvature correction device and actually mounted on an image forming apparatus, such curvature of main scanning line was preferably corrected at an initial period, but was not properly corrected over time. According to the examination of the inventors of the present disclosure, one possible cause was found that the holder holding the reflection mirror in the forcibly bent state was gradually deformed by the resilience of the reflection mirror.

SUMMARY

Consequently, the inventors discovered that there remains a need for a curvature correction device capable of effectively correcting a curvature of main scanning line in an optical scanning unit over a relatively long period, an optical scanning unit using the curvature correction device, and an image forming apparatus using the optical scanning unit.

Example embodiments of the present invention provide a curvature correction device capable of effectively correcting a curvature of main scanning line in an optical scanning unit over a relatively long period, an optical scanning unit using the curvature correction device, and an image forming apparatus using the optical scanning unit.

In one example embodiment of the present invention, a curvature correction device used in an optical scanning unit includes a holder and a pushing unit. The optical scanning unit that optically scans a scan target with a light beam includes a light beam emitter to emit the light beam, a deflection unit to deflect the light beam in a main scanning direction of the optical scanning unit, and a reflection mirror to reflect the light beam. The curvature correction device includes a holder and a pushing unit. The holder is configured to hold the reflection mirror in a state in which the reflection mirror is forcibly bent in a first direction.

The pushing unit is configured to push the reflection mirror held by the holder to bend the reflection mirror in a second direction opposite the first direction in which the reflection mirror is forcibly bent by the holder. The curvature correction device corrects the curvature of the main scanning line on the surface of the scan target by adjusting an amount at which the pushing unit pushes the reflection mirror. The holder has a stiffness larger than the reflection mirror.

In another example embodiment of the present invention, an optical scanning unit that optically scans a scan target with a light beam includes a light beam emitter, a deflector, a reflection mirror, and a curvature correction device. The light beam emitter is configured to emit the light beam. The deflector is configured to deflect the light beam emitted from the light beam emitter in a main scanning direction of the optical scanning unit. The reflection mirror is configured to reflect the light beam. The curvature correction device is configured to correct a curvature of a main scanning line on a surface of the scan target.

The curvature correction device further includes a holder and a pushing unit. The holder is configured to hold the reflection mirror in a state in which the reflection mirror is forcibly bent in a first direction. The pushing unit is configured to push the reflection mirror held by the holder to bend the reflection mirror in a second direction opposite the first direction in which the reflection mirror is forcibly bent by the holder. The curvature correction device corrects the curvature of the main scanning line on the surface of the scan target by adjusting an amount at which the pushing unit pushes the reflection mirror. The holder has a stiffness larger than the reflection mirror.

In still another example embodiment of the present invention, an image forming apparatus includes a latent image bearing member, an optical scanning unit, and a developing device. The latent image bearing member is configured to bear a latent image. The optical scanning unit is configured to optically scan a surface of the latent image bearing member with a light beam to form the latent image on the surface of the latent image bearing member. The developing device is configured to develop the latent image on the latent image bearing member.

The optical scanning unit includes a light beam emitter, a deflector, a reflection mirror, and a curvature correction device. The light beam emitter is configured to emit the light beam. The deflector is configured to deflect the light beam emitted from the light beam emitter in a main scanning direction of the optical scanning unit. The reflection mirror is configured to reflect the light beam.

The curvature correction device is configured to correct a curvature of a main scanning line on the surface of the latent image bearing member. The curvature correction device includes a holder and a pushing unit. The holder is configured to hold the reflection mirror in a state in which the reflection mirror is forcibly bent in a first direction. The pushing unit is configured to push the reflection mirror held by the holder to bend the reflection mirror in a second direction opposite the first direction in which the reflection mirror is forcibly bent by the holder. The curvature correction device corrects the curvature of the main scanning line on the surface of the latent image bearing member by adjusting an amount at which the pushing unit pushes the reflection mirror. The holder has a stiffness larger than the reflection mirror.

BRIEF DESCRIPTION OF THE DRAWINGS

A more complete appreciation of the disclosure and many of the attendant advantages thereof will be readily acquired as the same becomes better understood by reference to the following detailed description when considered in connection with the accompanying drawings, wherein.

Figure 1:
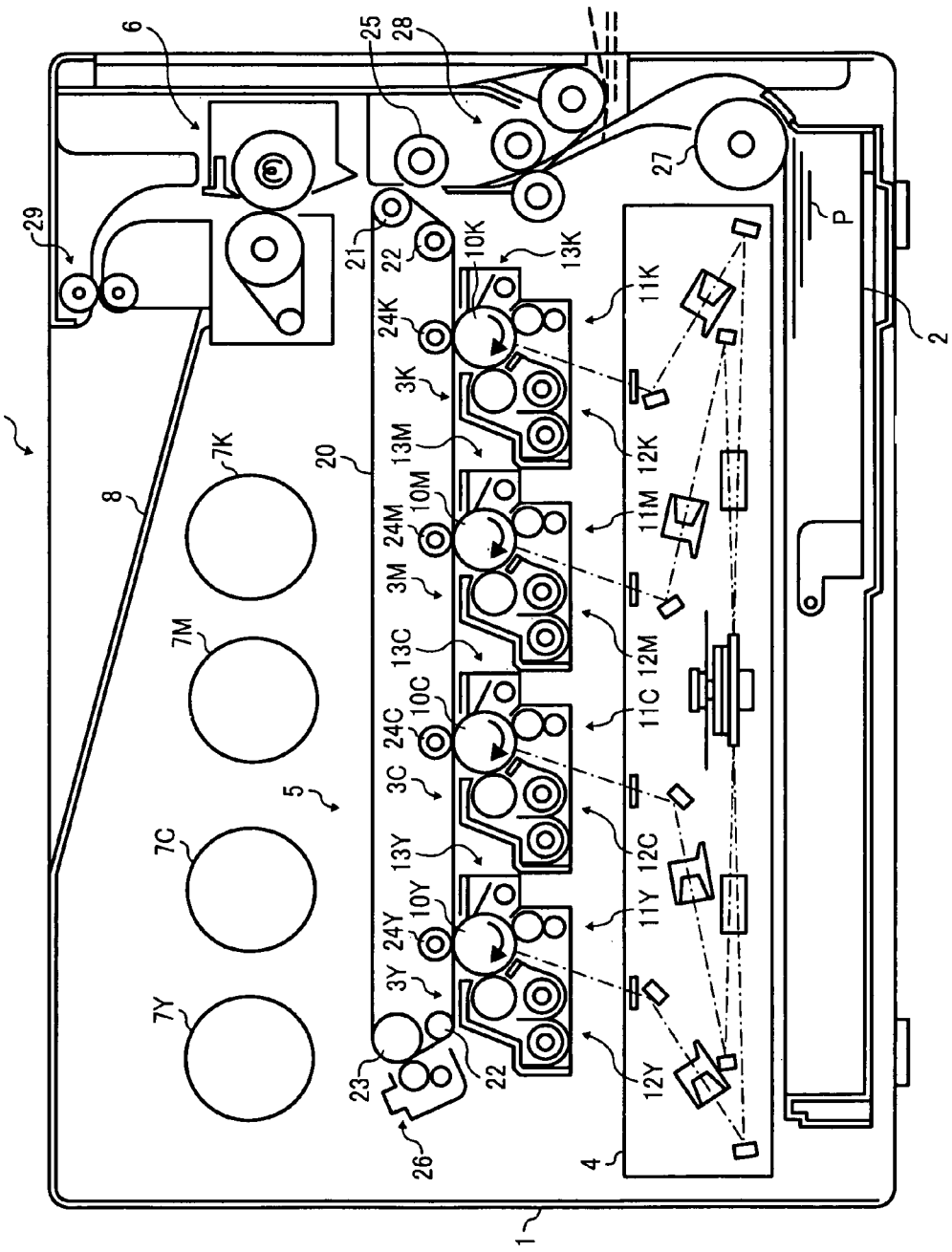
FIG. 1 is a schematic view illustrating a configuration of an image forming apparatus according to an example embodiment of the present invention.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION OF EXAMPLE EMBODIMENTS

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve the same results. For the sake of simplicity, the same reference numerals are used in the drawings and the descriptions for the same materials and constituent parts having the same functions, and redundant descriptions thereof are omitted.

Example embodiments of the present disclosure are now described below with reference to the accompanying drawings. It should be noted that, in a later-described comparative example, exemplary embodiment, and alternative example, the same reference numerals are used for the same constituent elements such as parts and materials having the same functions and achieving the same effects, and redundant descriptions thereof are omitted.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Below, an image forming apparatus according to an example embodiment is described as an electrophotographic color laser printer. It should be noted that example embodiments are not limited to such printer, and may be another type of printer, a copier, a facsimile machine, and a multi-functional device combining several of the foregoing capabilities.

FIG. 1 is a schematic view illustrating a configuration of an image forming apparatus 100 according to an example embodiment of the present disclosure.

In FIG. 1, the image forming apparatus 100 has a housing 1 and a sheet feed cassette 2 drawable from the housing 1. In the housing 1 are provided image forming stations 3Y, 3C, 3M, and 3K to form toner images or visualized images of yellow (Y), cyan (C), magenta (M), and black (K). Hereinafter, subscripts Y, C, M, and K added to numerical codes indicate components or members for yellow, cyan, magenta, and black, respectively.

Figure 2:
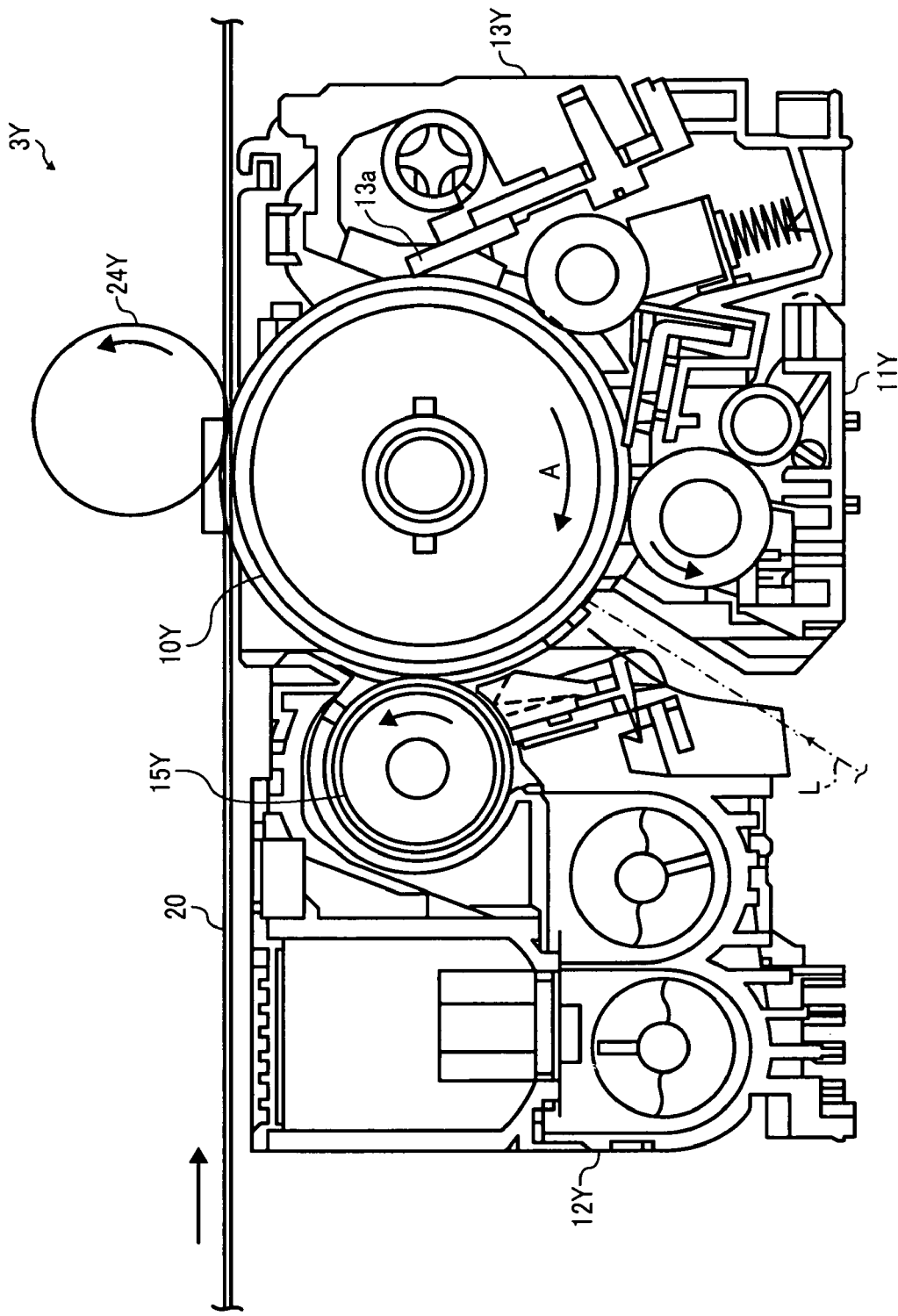
FIG. 2 is a schematic view illustrating a configuration of an image forming station for yellow used in the image forming apparatus of FIG. 1.

FIG. 2 is a schematic view illustrating a configuration of the image forming station 3Y for yellow. Incidentally, the other image forming stations 3C, 3M, and 3K have a configuration similar to that of the image forming station 3Y.

As illustrated in FIGS. 1 and 2, the image forming stations 3Y, 3C, 3M, and 3K may include drum-type photoconductors 10Y, 10C, 10M, and 10K as latent-image bearing members. Each of the photoconductors 10Y, 10C, 10M, and 10K rotates in a direction indicated by an arrow "A" in FIG. 2. Each photoconductor has a cylindrical substrate and a surface layer covering the surface of the substrate. For example, the substrate may be made of aluminium and have a diameter of 40 mm. The surface layer may be a photoreceptive layer of the organic photo conductor (OPC) type, for example.

Around the photoconductors 10Y, 10C, 10M, and 10K, the image forming stations 3Y, 3C, 3M, and 3K have chargers 11Y, 11C, 11M, and 11K, developing devices 12Y, 12C, 12M, and 12K, and cleaning devices 13Y, 13C, 13M, and 13K, respectively. The chargers 11Y, 11C, 11M, and 11K charge photoconductors 10Y, 10C, 10M, and 10K, respectively. The developing devices 12Y, 12C, 12M, and 12K develop latent images formed on the photoconductors 10Y, 10C, 10M, and 10K, respectively. The cleaning devices 13Y, 13C, 13M, and 13K clean residual toners remaining on the photoconductors 10Y, 10C, 10M, and 10K, respectively.

Below the image forming stations 3Y, 3C, 3M, and 3K is disposed an optical writing unit 4 functioning as an optical scanning unit that optically scans each of the photoconductors 10Y, 10C, 10M, and 10K with a light beam L.

Above the image forming stations 3Y, 3C, 3M, and 3K is disposed an intermediate transfer unit 5 having an intermediate transfer belt 20 onto which toner images formed by the image forming stations 3Y, 3C, 3M, and 3K are transferred. The image forming apparatus 100 also has a fixing unit 6 that fixes the toner images transferred onto the intermediate transfer belt 20 to a recording sheet P serving as a transfer member.

Further, toner bottles 7Y, 7C, 7M, and 7K that store color toners of yellow, cyan, magenta, and black, respectively, in an upper portion of the housing 1. The toner bottles 7Y, 7C, 7M, and 7K are detachable from the housing 1 by opening an ejection tray 8 formed at an upper portion of the housing 1.

The optical writing unit 4 functioning as the optical scanning device has a laser diode, for example, as a light emitter. The optical writing unit 4 emits the light beam L to a polygon mirror, which has a regular prism structure and is rotated by a motor. The light beam L is deflected in a main scanning direction of the optical writing unit 4 by mirror faces of the rotating polygon mirror. After reflected by a plurality of reflection mirrors, the light beam L is caused to scan a circumferential surface of each of the photoconductors 10Y, 10C, 10M, and 10K, which are uniformly charged by the chargers 11Y, 11C, 11M, and 11K, respectively. As a result, electrostatic latent images for Y, C, M, and K are formed on the corresponding surfaces of the photoconductors 10Y, 10C, 10M, and 10K, respectively. The optical writing unit 4 is described in detail later.

In FIG. 1, the intermediate transfer belt 20 of the intermediate transfer unit 5 functioning as a transfer unit is extended over a driving roller 21, tension rollers 22, and a driven roller 23, and rotated in a counterclockwise direction at an appropriate timing. The intermediate transfer unit 5 has primary transfer rollers 24Y, 24C, 24M, and 24K, a secondary transfer roller 25, and a belt cleaning device 26. The primary transfer rollers 24Y, 24C, 24M, and 24K primarily transfer the toner images formed on the photoconductors 10Y, 10C, 10M, and 10K onto the intermediate transfer belt 20. The secondary transfer roller 25 transfers the toner images primarily transferred onto the intermediate transfer belt 20 onto the recording sheet P. The belt cleaning devise 26 cleans residual toner that remains on the intermediate transfer belt 20 without being transferred onto the recording sheet P.

Next, a description is given of a process of obtaining a desired color image in the image forming apparatus 100.

First, in the image forming stations 3Y, 3C, 3M, and 3K, the photoconductors 10Y, 10C, 10M, and 10K are uniformly charged by the chargers 11Y, 11C, 11M, and 11K, respectively. Then, the optical writing unit 4 scans and exposes the photoconductors 10Y, 10C, 10M, and 10K with the light beam L generated based on image information to form electrostatic latent images on the surfaces of the photoconductors 10Y, 10C, 10M, and 10K. The electrostatic latent images are developed with the color toners carried on developing rollers 15Y, 15C, 15M, and 15K in the developing devices 12Y, 12C, 12M, and 12K to form toner images of yellow, cyan, magenta, and black, respectively.

The yellow, cyan, magenta, and black toner images on the photoconductors 10Y, 10C, 10M, and 10K are primarily transferred in a superposing manner onto the intermediate transfer belt 20, which is rotated in the counterclockwise direction in FIGS. 1 and 2 by the primary transfer rollers 24Y, 24C, 24M, and 24K. Such image forming processes in the image forming stations 3Y, 3C, 3M, and 3K are carried out at different timings so that the toner images are transferred to the same area on the intermediate transfer belt 20.

After the primary transfer process, the surfaces of the photoconductors 10Y, 10C, 10M, and 10K are cleaned by cleaning blades 13a of the cleaning devices 13Y, 13C, 13M, and 13K in preparation for a subsequent image forming process.

The color toners stored in the toner bottles 7Y, 7C, 7M, and 7K are supplied to the developing devices 12Y, 12C, 12M, and 12K of the image forming stations 3Y, 3C, 3M, and 3K as necessary.

Meanwhile, a recording sheet P in the sheet feed cassette 2 is conveyed into the housing 1 by a sheet feed roller 27 disposed close to the sheet feed cassette 2, and is conveyed to a secondary transfer area at an appropriate timing by registration rollers 28. In the secondary transfer area, the toner images on the intermediate transfer belt 20 is transferred onto the recording sheet P. When the recording sheet P passes through the fixing unit 6, the toner images are fixed on the recording sheet P. Then, the recording sheet P is ejected to the ejection tray 8 by ejection rollers 29. Similar to the photoconductors 10, residual toners remaining on the intermediate transfer belt 20 after the secondary transfer process is cleaned by the belt cleaning device 26 in contact with the intermediate transfer belt 20.

Next, a configuration of the optical writing unit 4 is described.

Figure 3:
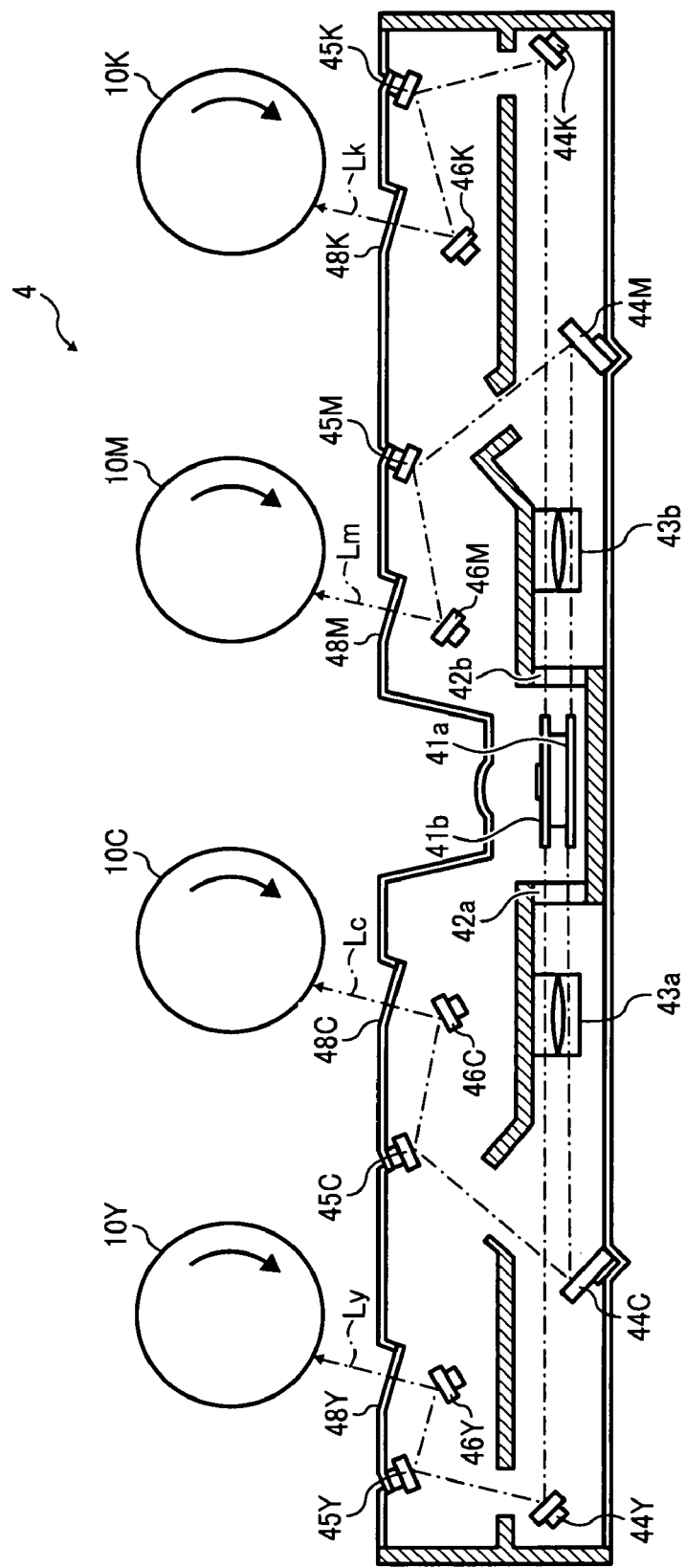
FIG. 3 is a schematic view illustrating a configuration of an optical writing unit and four photoconductors used in the image forming apparatus of FIG. 1.

FIG. 3 is a schematic view illustrating a configuration of the optical writing unit 4 used in the image forming apparatus 100.

In FIG. 3, the optical writing unit 4 includes polygon mirrors 41a and 41b having a regular prism structure. The polygon mirrors 41a and 41b have reflection mirrors on their six side faces and are vertically connected so that the respective middle portions of the regular prism structures are overlapped with each other. The polygon mirrors 41a and 41b are rotated at a relatively high speed on the same rotation axis line by a polygon motor not illustrated. Thus, when a light beam L is emitted from the laser diode to one side face, the light beam L is deflected by the polygon mirrors.

For example, the polygon mirror 41a deflects light beams Lc and Lm for cyan and magenta, which come from opposite directions each other, in the main scanning direction. The polygon mirror 41b deflects light beams Ly and Lk for yellow and black, which come from opposite directions each other, in the main scanning direction.

In the optical writing unit 4 of FIG. 3, a deflector to deflect the light beam L includes the polygon mirrors 41a and 41b and the polygon motor. The optical writing unit 4 also includes four reflection optical systems, sound-proof glasses 42a and 42b, scan lenses 43a and 43b, and dust-proof glasses 48a, 48b, 48c, and 48d.

The polygon motor and the polygon mirrors 41a and 41b are covered with a polygon cover to reduce noise. In order to cause the light beam L to pass through the polygon cover, the polygon cover is provided with the sound-proof glasses 42a and 42b. By passing through the sound-proof glasses 42a and 42b, the light beam L can travel in both areas inside and outside the polygon cover. Incidentally, the sound-proof glass 42a is passed by the light beams Ly and Lc, while the sound-proof glass 42b is passed by the light beams Lm and Lk.

The light beams Ly and Lc are deflected in the main scanning direction by the polygon mirror, pass through the sound-proof glass 42*a*, and pass through the scan lens 43*a* in parallel with each other above and below. The scan lens 43*a* focuses the light beams Ly and Lc in both the main scanning and sub-scanning directions. Thus, the scan lens 43*a* converts a uniform angular motion in the main scanning direction, performed by each polygon mirror, into a uniform linear motion, and simultaneously corrects a face inclination of each polygon mirror. After passing through the sound-proof glass 42*b*, the light beams Lm and Lk for magenta and black pass through the scan lens 43*b*, which is disposed on the opposite side with respect to the polygon cover.

Each of the four reflection optical systems in the optical writing unit 4 includes the above-described laser diode and reflection mirrors. For example, the reflection optical system for yellow includes a laser diode for yellow, a first reflection mirror 44Y, a second reflection mirror 45Y, and a third reflection mirror 46Y. Such reflection mirrors have no lens function. Similarly, the reflection optical systems for cyan, magenta, and black also have first reflection mirrors 44C, 44M, and 44K, second reflection mirrors 45C, 45M, and 45K, and third reflection mirrors 46C, 46M, and 46K.

After passing through the scan lenses 43*a* and 43*b*, the light beams Ly, Lc, Lm, and Lk are forwarded to the respective mirrors in the reflection optical systems for Y, C, M, and K, respectively. For example, after passing through the scan lens 43*a*, the light beam Ly for Y is sequentially reflected by the mirror faces of the first reflection mirror 44Y, the second reflection mirror 45Y, the third reflection mirror 46Y. Thus, the light beam Ly is reflected third times and guided onto the surface of the photoconductor 10Y. Similarly, each of the light beam Lc, Lm, and Lk for C, M, and K is reflected by the corresponding three reflection mirrors to be guided onto the surface of each of the photoconductors 10C, 10M, and 10K. After reflected by the third reflection mirrors 46Y, 46C, 46M, and 46K, the light beam Ly, Lc, Lm, and Lk pass through the dust-proof glasses 48Y, 48C, 48M, and 48K provided on an upper face of the optical writing unit 4 and reach the surfaces of the photoconductors 10Y, 10C, 10M, and 10K, respectively.

Next, the configuration of the image forming apparatus 100 is described in further detail below.

The optical writing unit 4 of the image forming apparatus 100 has curvature correction devices 200Y, 200C, 200M, and 200K and inclination correction devices 300Y, 300C, 300M, and 300K in the reflection optical systems for Y, C, M, and K, respectively. Each curvature correction device 200 adjusts a bent state of one of the reflection mirrors to adjust the direction or amount of curvature of main scanning line. Each inclination correction device 300 adjusts an inclination of the reflection mirror. The curvature correction devices 200Y, 200C, 200M, and 200K and the inclination correction devices 300Y, 300C, 300M, and 300K are described below as one example of the reflection optical system for Y.

Figure 4:
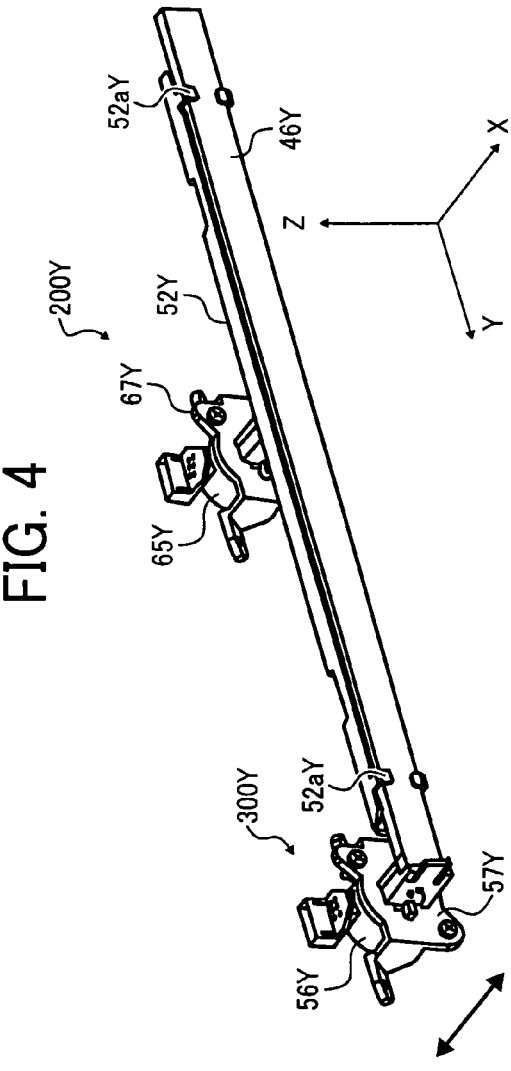
FIG. 4 is a perspective view illustrating a third reflection mirror for yellow and its surrounding configuration in the optical writing unit of FIG. 3, seen from a mirror-face side of the third reflection mirror.

FIG. 4 is a perspective view illustrating the third reflection mirror 46Y for yellow and its surrounding configuration viewed from the mirror face side of the third reflection mirror 46Y.

Figure 5:
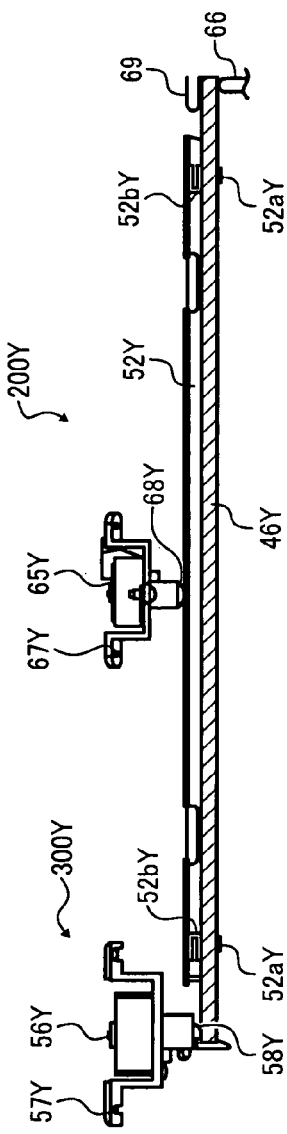
FIG. 5 is a vertical cross-sectional view illustrating the third reflection mirror and its surrounding configuration.

FIG. 5 is a vertical cross-sectional view illustrating the third reflection mirror 46Y and its surrounding configuration.

In FIGS. 4 and 5, the third reflection mirror 46Y is held from the back side by a holder 52Y having a substantially C-shape in cross section. Each end portion of the third reflection mirror 46Y in the longitudinal direction is projected from each end portion of the holder 52Y in the longitudinal direction.

Figure 6:
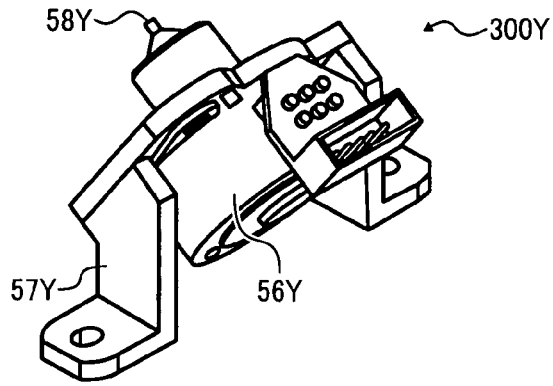
FIG. 6 is an enlarged perspective view illustrating an inclination adjustment device for yellow in the optical writing unit of FIG. 3.

The inclination correction device 300Y is pressed against the back side of one of the longitudinal end portions of the third reflection mirror 46Y. As illustrated in FIG. 6, the inclination correction device 300Y has an inclination-adjustment pulse motor 56Y, a motor holder 57Y, and an inclination adjuster 58Y.

As illustrated in FIGS. 4 and 5, a pushing unit of the curvature correction device 200Y is pressed against the back face of a middle portion of the third reflection mirror 46Y in the longitudinal direction. The pushing unit has a curvature adjustment pulse motor 65Y, a motor holder 67Y, and a curvature adjuster 68Y.

Figure 7:
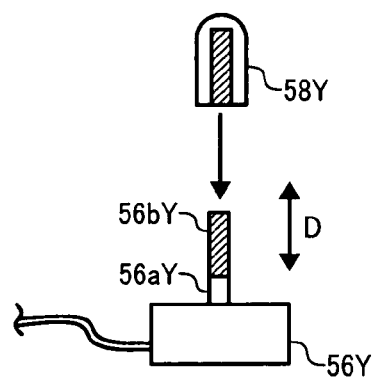
FIG. 7 is a side view illustrating an inclination-adjustment pulse motor and an inclination adjuster of the inclination correction device.

FIG. 7 is a side view illustrating the inclination-adjustment pulse motor 56Y and the inclination adjuster 58Y.

Figure 8:
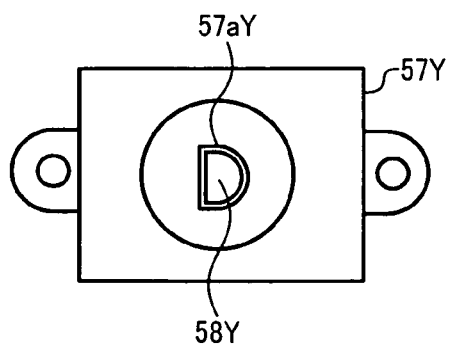
FIG. 8 is a plan view illustrating a motor holder and the inclination adjuster of the inclination correction device.

FIG. 8 is a plan view illustrating the motor holder 57Y and the inclination adjuster 58Y.

As illustrated in FIG. 7, the inclination-adjustment pulse motor 56Y has a rotation shaft 56*a*Y with an external thread 56*b*Y. The inclination adjuster 58Y has an internal thread for the external thread 56*b*Y. By screwing the external thread 56*b*Y together with the internal thread, the inclination adjuster 58Y is fixed to the rotation shaft 56*a*Y.

As illustrated in FIG. 8, the inclination adjuster 58Y has a cross-section of substantially D-shape and is inserted to an adjuster slot 57*a*Y of the motor holder 57. When the rotation shaft 56*a*Y of the inclination-adjustment pulse motor 56Y is rotated, the inclination adjuster 58Y is latched by the adjuster slot 57*a*Y, thereby preventing the inclination adjuster 58Y from rotating. With the rotation of the rotation shaft 56*a*Y, the inclination adjuster 58Y is elevated in directions indicated by a double arrow D in FIG. 7.

Incidentally, the above-described pushing unit of the curvature correction device 200Y has a configuration similar to that of the inclination correction device 300Y.

In FIG. 5, the motor holder 57Y holding the inclination-adjustment pulse motor 56Y is fixed to the housing 1, not illustrated in FIG. 5, of the image forming apparatus 100. A tip of the inclination adjuster 58Y, screwed together with the external thread 56*b*Y of the inclination-adjustment pulse motor 56Y, is pressed against the mirror face of one end portion (hereinafter "motor-side end portion") of the third reflection mirror 46Y.

The other end portion (hereinafter "fulcrum-side end portion") of the third reflection mirror 46Y on the side opposite the side of the inclination-adjustment pulse motor 56Y is mounted on a support portion 66 formed on the housing 1 of the image forming apparatus 100. In this state, a leaf spring 69 fixed on the housing 1 is pressed against the back face of the third reflection mirror 46Y, so that the third reflection mirror 46Y is sandwiched between the support portion 66 and the leaf spring 69.

Figure 9:
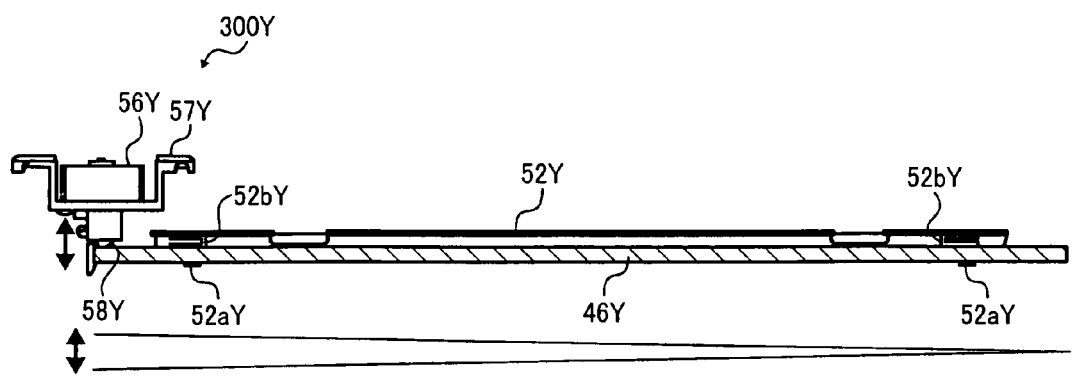
FIG. 9 is an enlarged view illustrating a cross section of the third reflection mirror, the inclination correction device, and a holder.

Rotating the rotation shaft 56*a*Y causes the inclination adjuster 58Y, screwed together with the rotation shaft of the inclination-adjustment pulse motor 56Y, to elevate to change the amount at which the inclination adjuster 58Y pushes the motor-side end portion of the third reflection mirror 46Y. Thus, as illustrated in FIG. 9, the motor-side end portion of the third reflection mirror 46Y pivots around the fulcrum-side end portion sandwiched between the support portion 66 and the leaf spring 69 with respect to the elevating direction of the inclination adjuster 58Y. Such pivoting motion changes the inclination of the third reflection mirror 46Y. Thus, the inclination of the third reflection mirror 46Y is adjusted by changing the rotation amount of the inclination-adjustment pulse motor 56Y.

In FIG. 5 described above, the pushing unit causes the tip of the curvature adjuster 68Y to be pressed against the back face of the middle portion of the third reflection mirror 46Y in the longitudinal direction. The amount at which the pushing unit pushes the longitudinal middle portion of the third reflection mirror 46Y varies with the elevation of the inclination adjuster 68Y, which is performed in a manner similar to that of the above-described inclination correction device.

Figure 10:
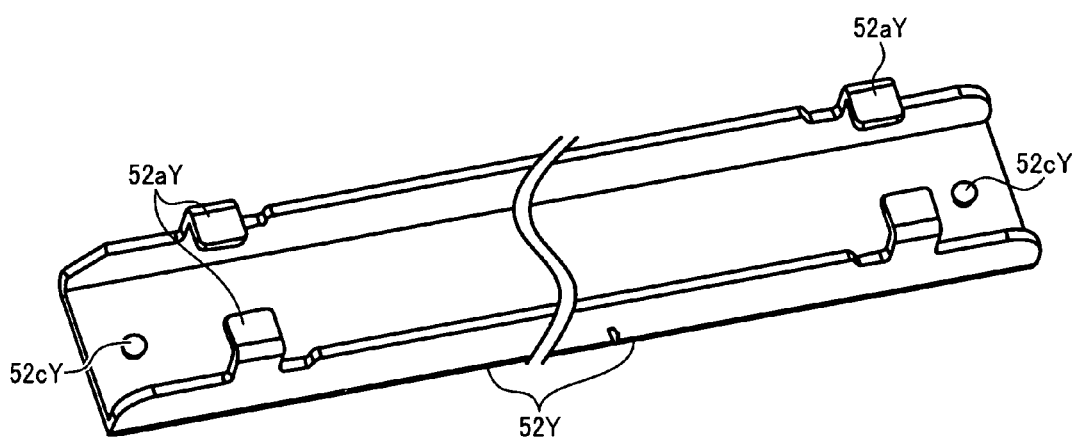
FIG. 10 is a partial enlarged perspective view illustrating end portions of the holder.

FIG. 10 is a partially enlarged perspective view illustrating the end portions of the holder 52Y. As described above with reference to FIG. 4, the holder 52Y is disposed to hold the third reflection mirror 46Y from the back side of the third reflection mirror 46Y. As illustrated in FIG. 10, the holder 52Y has two hooks 52aY, arrayed in the width direction, at each end portion in the longitudinal direction. The hooks 52aY are integrally formed with a main body of the holder 52Y. For the holder 52Y, the hooks 52aY are hooked on the mirror face of the third reflection mirror 46Y as illustrated in FIG. 4 to hold the third reflection mirror 46Y from the mirror-face side.

Further, as illustrated in FIG. 5, the holder 52Y has a leaf spring 52bY functioning as a pressing member on each end portion in the longitudinal direction. Each leaf spring 52bY urges the back side, that is, non-mirror side of the third reflection mirror 46Y toward the mirror-face side at a portion closer to each end in the longitudinal direction than each hook 52aY. Incidentally, as illustrated in FIG. 10, the holder 52Y has a screw hole 52cY to fix each leaf spring 52bY at the corresponding end portion in the longitudinal direction.

Figure 11:
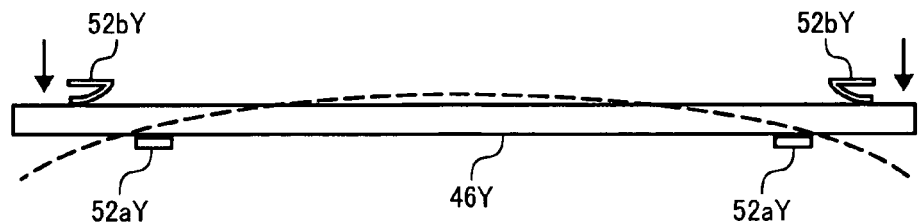
FIG. 11 illustrates a forcibly bent state of the third reflection mirror held by the holder.

When the respective end portions of the third reflection mirror 46Y are urged from the back-face side by the leaf springs 52bY, as indicated by a dashed line in FIG. 11 the third reflection mirror 46Y is forcibly bent so that a middle portion of the third reflection mirror 46Y is bent toward the back-face side while using the hooks 52aY as fulcrums. That is, the holder 52Y holds the third reflection mirror 46Y in such state that the third reflection mirror 46Y is forcibly bent toward the back-face side.

Figure 12:
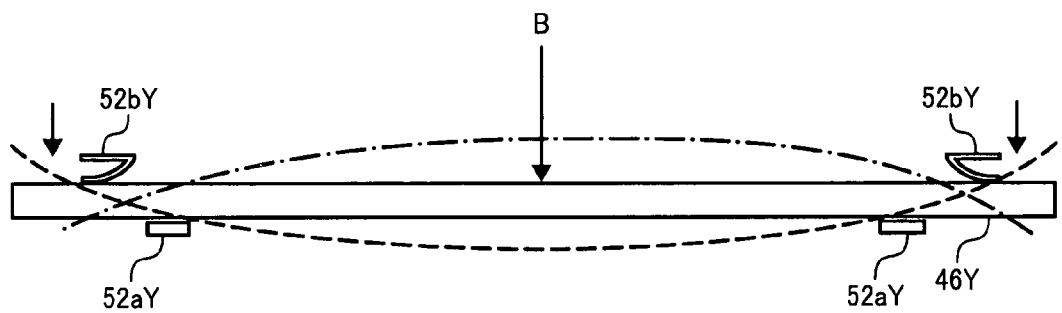
FIG. 12 illustrates a state in which the forcibly bent state of the third reflection mirror is corrected by a pushing unit of a curvature adjustment device.

In such state, the pushing unit including the curvature-adjustment pulse motor 65Y pushes the back face of the longitudinal middle portion of the third reflection mirror 46Y. Thus, as indicated by an arrow B in FIG. 12, a pushing force enough to bend the third reflection mirror 46Y in a direction opposite the forcibly bent direction illustrated in FIG. 11 is applied to the longitudinal middle portion of the third reflection mirror 46Y. Thus, as indicated by a dash-single-dot line and a dashed line in FIG. 12, the pushing unit can reduce the amount at which the third reflection mirror 46Y is curved toward the back-face side, or can bend the third reflection mirror 46Y in the direction opposite the forcibly curved direction.

As described above, the reflection optical system having such configuration can bend the third reflection mirror 46Y in a direction toward any side of the back-face and mirror-face sides, thereby correcting the curvature of a main scanning line on the surface of photoconductor toward any side of the upstream and downstream sides with respect to the sub-scanning direction.

The holder 52Y has a stiffness greater than that of the third reflection mirror 46Y. For example, the holder 52Y may be made of an electrolytic zinc-coated steel sheet (SECC) having a young's modulus E of 2×100,000 MPa, while the third reflection mirror 46Y may be made of a glass having a young's modulus E of 7×100,000 MPa. The holder 52Y also has a substantially C-shape in cross section so as to generate a large geometrical moment of inertia. As a result, the deformation amount of the holder 52Y is smaller than that of the third reflection mirror 46Y. According to an equation on beam element known in the field of material mechanics, such deformation amount is inversely proportional to young's modulus E and geometrical moment of inertia. Therefore, the deformation amount of the holder 52Y is considerably smaller than that of the third reflection mirror 46Y.

Such stiffness varies depending on cross-sectional shape, length, thickness, and/or Young's modulus. In the present exemplary embodiment, the thickness, cross sectional shape, geometrical moment of inertia, and other parameters of the holder are set so that, when the third reflection mirror 46Y is forcibly bent by the holder 52Y, the curvature amount of the holder 52Y may be not more than one hundredth of that of the third reflection mirror 46Y. More specifically, the holder 52Y may be formed in a thickness of 1 mm, for example.

Figure 15:
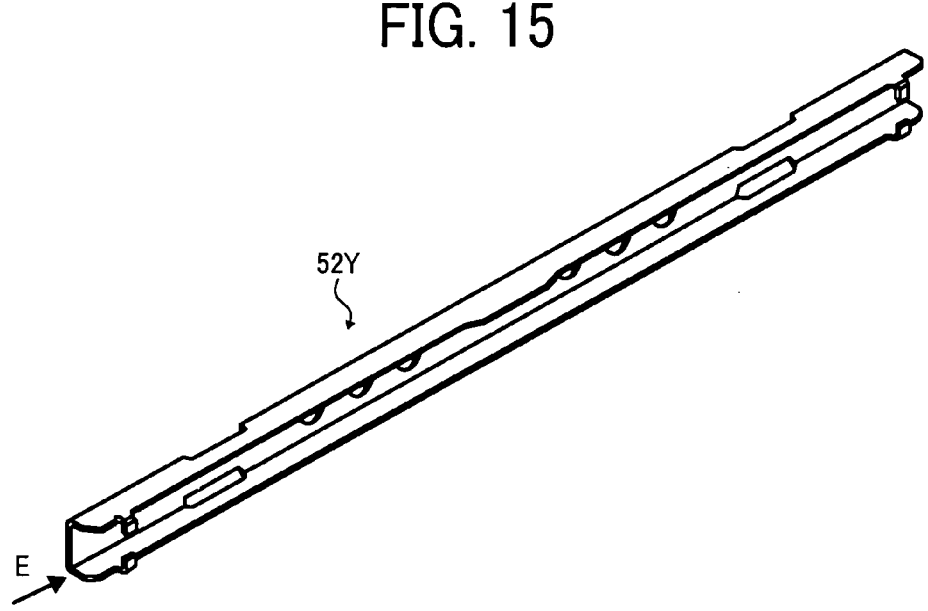
FIG. 15 is a perspective view illustrating the holder of FIG. 14 seen from its mirror-support side.
Figure 16:
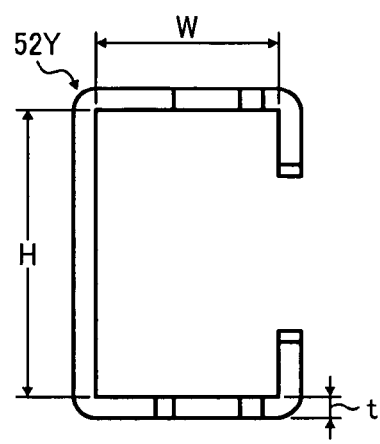
FIG. 16 is a side view of the holder seen from a direction indicated by E in FIG. 15.

As described above, the holder 52Y has a substantially C-shape in cross section to increase its geometrical moment of inertia, thereby preventing the holder 52Y from being largely deformed by a reactive force of the third reflection mirror 46Y against the forcible bending. For example, when the holder 52Y has a substantially C-shape in cross section illustrated in FIG. 15 or 16, the holder 52Y may have a geometrical moment of inertia more than three times as large as that of a typical holder having a plate shape. For example, the thickness t, the width W, and the height H of the holder 52Y in FIG. 16 may be 1 mm, 8 mm, and 13 mm, respectively.

In such configuration, the holder 52Y, which holds the third reflection mirror 46Y in a forcibly bent state, has a greater stiffness than that of the third reflection mirror 46Y, thereby more effectively preventing the holder 52Y from being largely deformed over time than a configuration in which the holder 52Y has a stiffness identical to or smaller than that of the third reflection mirror 46Y. Thus, the curvature of main scanning line can be effectively corrected in the long period.

In the above description, although only the inclination correction device and the curvature correction device (the holder and the pushing unit) in the reflection optical system for Y are described with reference to the drawings, it should be noted that the reflection optical systems for C, M, and K have similar, if not the same, configurations.

Further, although the inclination correction device and the curvature correction device are provided to the third reflection mirror in the above description, it should be noted that such inclination correction device and curvature correction device may be provided to the first reflection mirror or the second reflection mirror.

Moreover, in the above description, the inclination correction device and the curvature correction device are provided to each of the reflection optical systems for Y, C, M, and K. Alternatively, for example, based on the inclination and curvature of a main scanning line in one of the reflection optical systems for Y, C, M, and K, the inclinations and curvatures of main scanning lines in the other ones may be corrected. In such case, the "reference" reflection optical system do not need to have the inclination correction device and the curvature correction device. Accordingly, the number of each of the inclination correction device and the curvature correction device can be reduced to a number which is smaller than that of the laser diodes by one.

Such inclination adjustment of main scanning line on the surface of photoconductor is conducted before product shipment. Alternatively, such adjustment may be conducted when the number of printed sheets reaches a predetermined number during operation and/or when an operator requests such inclination adjustment to the image forming apparatus.

For such inclination adjustment, a predefined electrostatic latent image for detecting positional deviation is formed on each of the photoconductors 10Y, 10C, 10M, and 10K illustrated in FIG. 3 through an image forming operation substantially identical to the normal image forming operation. The electrostatic latent image for detecting positional deviation in each color is developed through a development process similar to that of the normal image forming operation to form a toner image for detecting positional deviation in each color. Such toner images of the different colors are primarily transferred onto the intermediate transfer belt 20 so as not to be overlapped with each other. Thus, an image pattern for detecting positional deviation is formed, in which the toner images of the different colors are arranged in a predefined order.

With rotation of the intermediate transfer belt 20, the toner images of the image pattern are detected by an optical sensor not illustrated. A controller of the image forming apparatus 100 determines relative positional deviation between the toner images based on timings at which the respective toner images are detected by the optical sensor. Based on the relative positional deviation thus determined, the inclination amount of the main scanning line of each of Y, C, and M relative to the main scanning line of B is calculated so as to minimize the amount of the relative positional deviation between the toner images.

Subsequently, based on the calculation results, the inclination-adjustment pulse motor (for example, 56Y) is rotated at a predetermined rotation angle in a forward or reverse direction, thereby resulting in a change in the inclination of the reflection mirror. Such change in the inclination of the reflection mirror may change the incidence position of the light beam L relative to the mirror surface, thereby resulting in a change in the inclination of main scanning line on the photoconductor 10Y. Thus, the inclination of main scanning line having been generated before the inclination adjustment can be properly corrected.

The curvature adjustment of main scanning line on the photoconductor is conducted at timings similar to those of the above-described inclination adjustment. At an initial state just after the assembly of image forming apparatus, the reflection mirror may be bent as indicated by the dashed line illustrated in FIG. 11. In such initial state, the main scanning line of the optical writing unit also has a curved shape. From such initial state, the curvature adjustment pulse motor (for example, 65Y) functioning as the pushing unit of the curvature correction device is rotated so that the curvature adjuster (for example, 68Y) is pressed against the back face of a longitudinal middle portion of the reflection mirror (for example, 46Y). Further, by adjusting the elevation amount of the curvature adjuster, the curvature of main scanning line can be properly corrected.

Such curvature adjustment is conducted concurrently with the above-described inclination adjustment. For example, the controller determines the curvature amount of main scanning line of each color based on the detection results of the above-described image pattern for detecting positional deviation. Then, the correction amount of the reflection mirror of each color is calculated so as to minimize the determined curvature amount of each color. Based on the calculation results, the curvature adjustment pulse motor (for example, 65Y) is rotated at a predetermined rotation angle in a forward or reverse direction, thereby allowing the curvature of main scanning line to be properly corrected.

Figure 13:
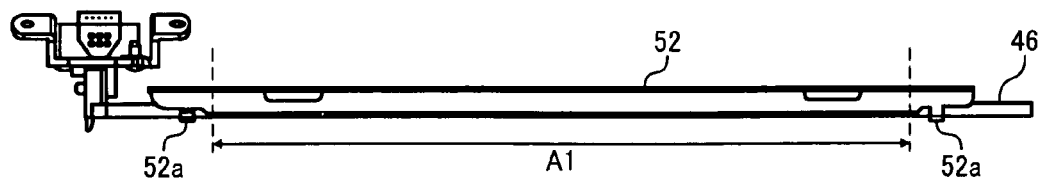
FIG. 13 illustrates an effective range of a main scanning line of the optical writing unit and positions of hooks.

As illustrated in FIG. 13, the holder 52 of the curvature correction device in the reflection optical system for each color has the hooks 52a, functioning as the support member, outside an effective range A1 of main scanning line in the main scanning direction. For example, when the third reflection mirror 46 is greatly inclined by the inclination correction device or the third reflection mirror 46 is largely bent by the curvature correction device, the hooks 52a may be disposed on the optical path of a light beam. In such case, the above-described configuration can effectively prevent image quality from being degraded.

Figure 14:
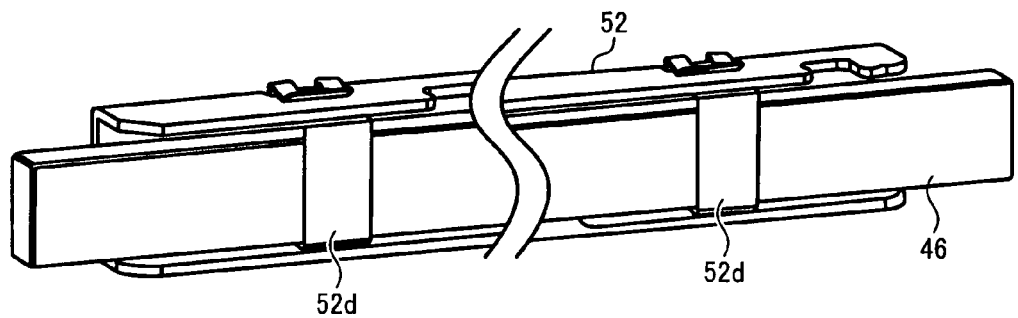
FIG. 14 is a partially enlarged perspective view illustrating a third reflection mirror and end portions of a holder in an image forming apparatus according to a variation example.

FIG. 14 is a partially enlarged perspective view illustrating end portions of a holder 52 together with a third reflection mirror 46 according to a variation example.

The holder 52 has a support hardware 52d on each end portion instead of the hooks 52a integrally formed with the main body. Each support hardware 52d is provided separately from the main body of the holder 52Y so as to be latched on each end portion of the holder 52Y after the third reflection mirror 46 is placed into the holder 52.

Such configuration can improve the assembling efficiency of the third reflection mirror 46, compared to the above-described configuration in which the hooks 52a are integrally formed with the main body of the holder 52. However, when each support hardware 52d is provided separately from the main body, the manufacturing cost may become higher than that of the above-described configuration. By contrast, the above-described configuration in which the hooks 52a are integrally formed with the main body can reduce cost.

Figure 17:
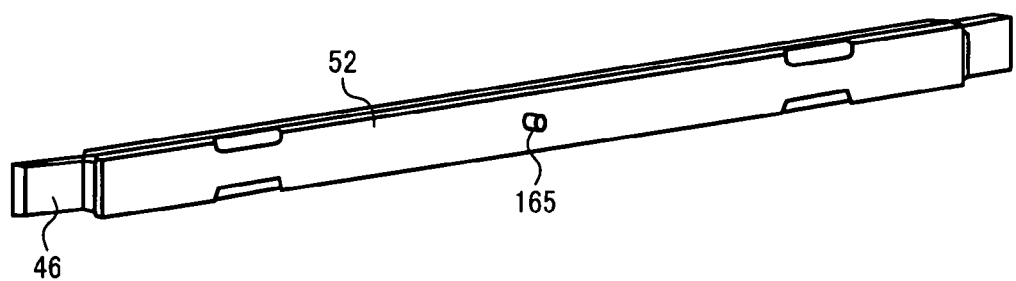
FIG. 17 is a perspective view illustrating a configuration in which the pushing unit is an adjustment screw, seen from a back-face side of the third reflection mirror.

FIG. 17 is a perspective view illustrating a configuration in which the holder 52 has an adjustment screw 165 as the pushing unit, seen from the back-face side of the third reflection mirror 46.

As illustrated in FIG. 17, the holder 52Y has a screw hole in a longitudinal middle portion of the holder 52. The adjustment screw 165 is screwed together with the screw hole. A tip of the adjustment screw 165 is pressed against the back face of the longitudinal middle portion of the third reflecting mirror 46.

Figure 18:
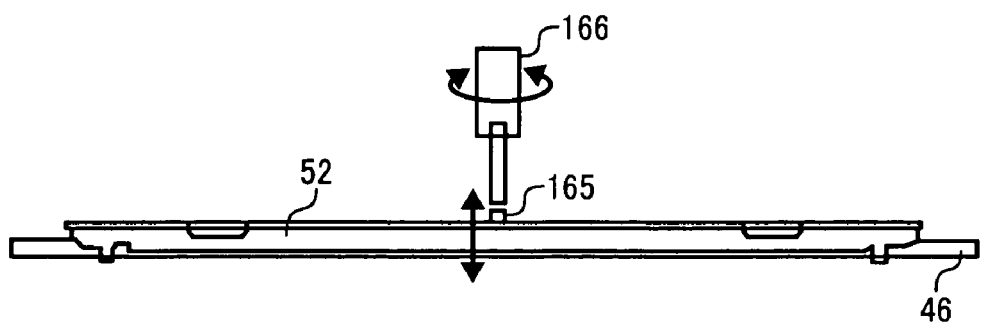
FIG. 18 is an illustration for explaining curvature adjustment of the third reflection mirror in the configuration of FIG. 17.

As illustrated in FIG. 18, a jig 166 for rotating the adjustment screw 165 is used to fasten or loosen the adjustment screw 165, thereby changing the amount at which the adjustment screw 165 pushes the longitudinal middle portion of the third reflection mirror 46. Thus, as indicated by the dash-single-dot line and the dashed line illustrated in FIG. 12, the curvature amount of the third reflection mirror 46 toward the back-face side can be reduced or the third reflection mirror 46 can be bent toward the mirror-face side.

Further, using the adjustment screw 165 as the pushing unit can provide a simpler configuration, thereby reducing cost.

Figure 19:
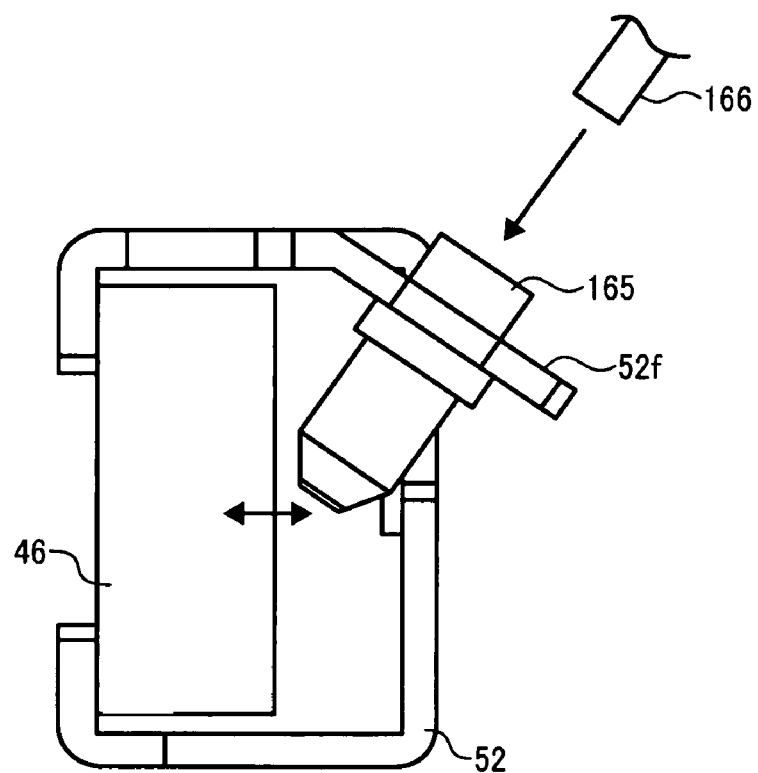
FIG. 19 is a schematic view illustrating a variation example of the configuration of FIG. 17.

As illustrated in FIG. 19, the holder 52 may have an adjustment-screw mount face 52f inclined to the back face of the third reflection mirror 46. The adjustment-screw mount face 52f may have a screw hole extending in a direction perpendicular to the adjustment-screw mount face 52f to be screwed together with the adjustment screw 165. Accordingly, the third reflection mirror 46Y is pushed by the adjustment screw 165 from an oblique direction relative to the back face of the third reflection mirror 46.

Such configuration can reduce the amount at which the third reflection mirror 46 is pushed per rotation amount of the adjustment screw 165, compared to the configuration of FIG. 17 in which the third reflection mirror 46 is pushed by the adjustment screw 165 from a substantially vertical direction relative to the third reflection mirror 46. Accordingly, the adjustment resolution of the adjustment screw 165 can be enhanced, thereby improving the accuracy of curvature correction.

As illustrated in FIG. 3, the housing of the optical writing unit 4 faces the back face of the third reflection mirror 46. Consequently, as illustrated in FIGS. 17 and 18, in the configuration in which the adjustment screw 165 is disposed substantially vertically to the back face of the third reflection mirror 46, the jig 166 needs to be engaged with the tip of the adjustment screw 165 from a direction indicated by an arrow "R" in FIG. 20, thereby causing a portion of the housing to prevent a smooth operation of the operator.

Figure 20:
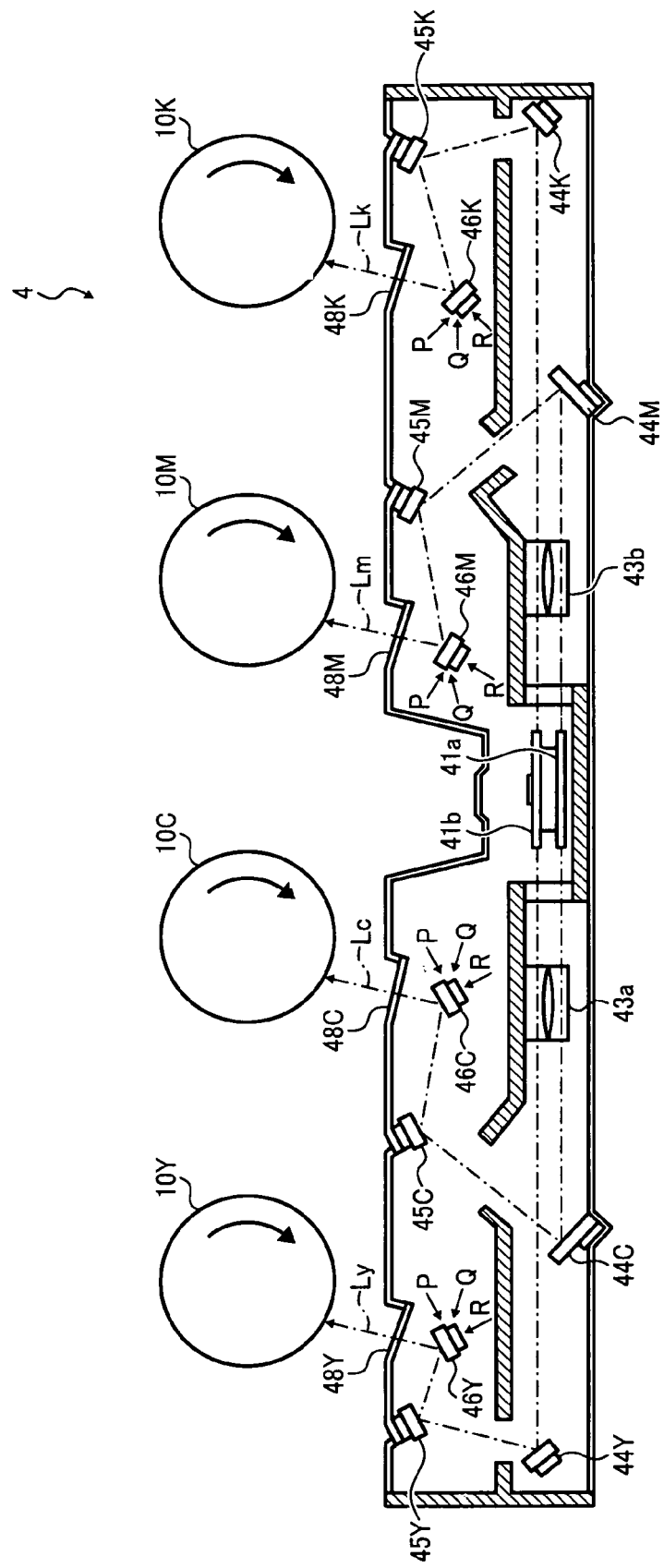
FIG. 20 is an illustration for explaining an access direction of a jig.

By contrast, as illustrated in FIG. 19, when the adjustment screw 165 is disposed obliquely to the back face of the third reflection mirror 46Y, the adjustment-screw mount face 52*f* is disposed so that the jig 166 can be engaged with the tip of the adjustment screw 165 from a direction indicated by an arrow "Q" in FIG. 20. Accordingly, such engaging operation is not prevented by the housing of the optical writing unit 4. Such configuration can facilitate the curvature adjustment, compared to the configuration in which the adjustment screw 165 is disposed substantially vertically to the back face of the third reflection mirror 46.

Although in FIGS. 17 to 19 one adjustment screw is provided to the longitudinal middle portion of the third reflection mirror 46, a plurality of adjustment screws may be provided to the third reflection mirror 46 in the longitudinal direction. In such configuration, the curvature of the reflection mirror may be corrected by separately adjusting the pushing amounts of the respective adjustment screws.

Figure 21:
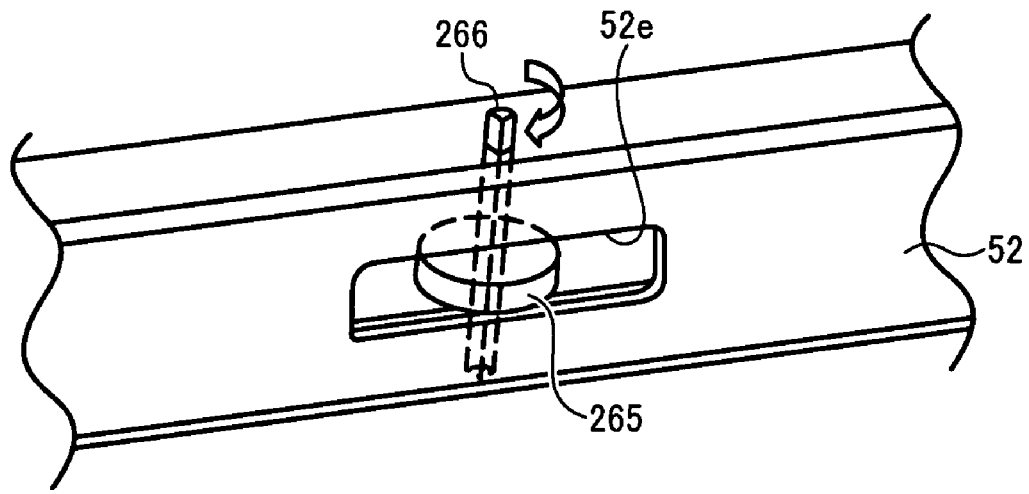
FIG. 21 is a perspective view illustrating a configuration in which the pushing unit is a cam member, seen from the back-face side of the third reflective mirror.

FIG. 21 is a perspective view illustrating a configuration in which the holder 52 has a cam member 265 as the pushing unit, seen from the back-face side of the third reflection mirror 46.

Figure 22:
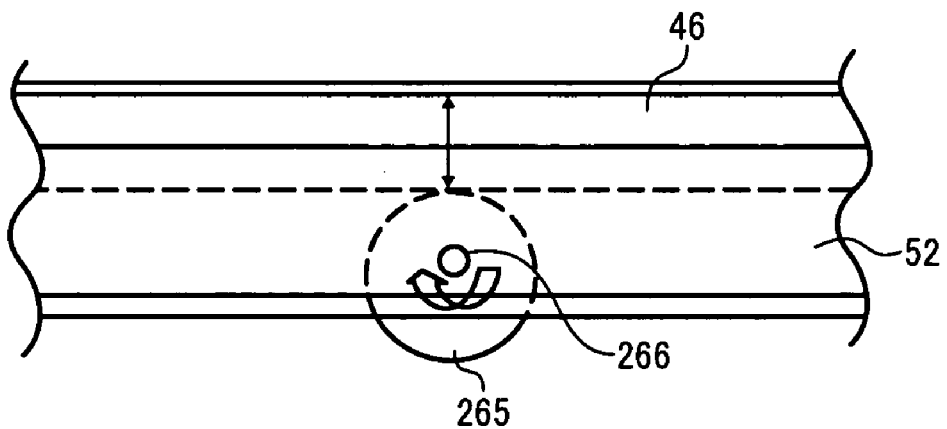
FIG. 22 is an illustration for explaining curvature adjustment of the third reflecting mirror in the configuration of FIG. 21.

As illustrated in FIG. 21, the holder 52 has a long hole 52*e* at a middle portion in the longitudinal direction. The cam member 265 is rotatably mounted to the long hole 52*e*. In such configuration, as illustrated in FIG. 22, a cam shaft 266 is rotatably mounted to the top and bottom faces of the holder 52. Rotating the cam shaft 266 with a jig or other member can change the amount at which the third reflection mirror 46Y is pushed by the cam member 265. Thus, as indicated by the dash-single-dot line and the dashed line of FIG. 12, the curvature amount of the third reflection mirror 46 toward the back-face side can be reduced or the third reflection mirror 46 can be bent toward the mirror-face side.

In such configuration illustrated in FIG. 21, as indicated by an arrow P in FIG. 20, an operator can access the cam shaft 266 from a direction perpendicular to the direction in which the third reflection mirror 46 is pushed by the cam member 265, thereby facilitating the operation of curvature adjustment.

In the above description, the curvature correction device is provided to the third reflection mirror 46. Preferably, such curvature correction device may be provided to one reflection mirror forming a largest obtuse angle between incident light and reflection light among the first to third reflection mirrors.

Below, a description is given of a configuration in which an obtuse angle is formed between incident light and reflection light and a configuration in which an acute angle is formed therebetween, taking the third reflection mirror 46 as an example.

Figure 23:
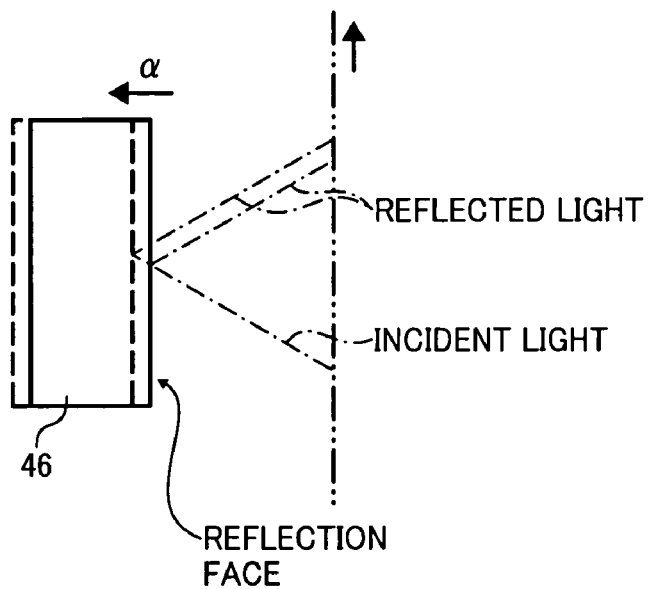
FIG. 23 is an illustration for explaining a curvature amount of main scanning line observed when a middle portion of a third reflection mirror is bent at a certain amount in a configuration in which an acute angle is formed between light incident to and light reflected by the third reflection mirror.

FIG. 23 is an illustration for explaining a curvature amount of main scanning line observed when a middle portion of the third reflection mirror 46 is bent by a certain amount α in the configuration in which an acute angle is formed between light incident to and light reflected by the third reflection mirror 46.

Figure 24:
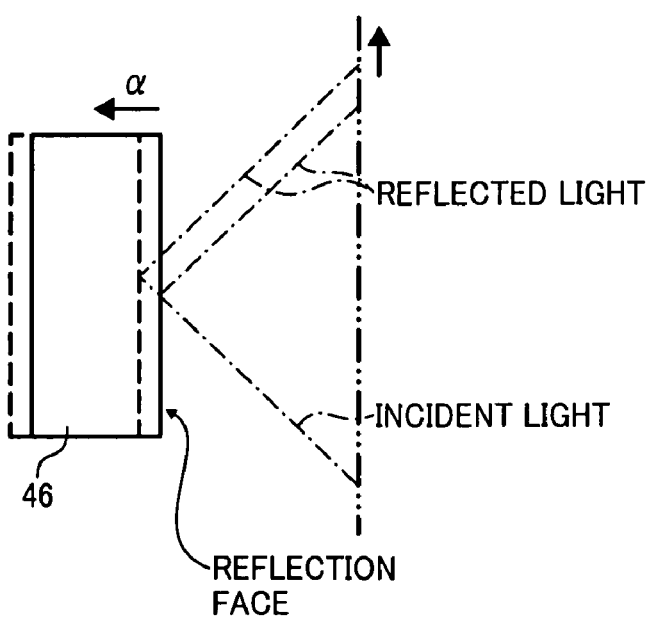
FIG. 24 is an illustration for explaining a curvature amount of main scanning line observed when a middle portion of a third reflection mirror is bent at the certain amount in a configuration in which an obtuse angle is formed between light incident to and light reflected by the third reflection mirror.

FIG. 24 is an illustration for explaining a curvature amount of main scanning line observed when the middle portion of the third reflection mirror 46 is bent by the certain amount α in the configuration in which an obtuse angle is formed between light incident to and light reflected by the third reflection mirror 46.

As illustrated in FIGS. 23 and 24, when the middle portion of the third reflection mirror 46 is bent by the identical amount α, the curvature of main scanning line in the obtuse-type configuration of FIG. 24 is larger than in the acute-type configuration of FIG. 23. Therefore, when the third reflection mirror 46 is bent to correct the curvature of main scanning line on the surface of photoconductor, setting an obtuse angle between incident light and reflection light can reduce the curvature amount of the third reflection mirror 46Y compared to setting an acute angle therebetween. Accordingly, such configuration can prevent a significant difference from being generated in the length of optical path in the longitudinal middle portion of such reflection mirror after the curvature adjustment, thereby preventing the degradation of the beam spot property.

Thus, when the curvature correction device is provided to one reflection mirror forming a largest obtuse angle between incident light and reflection light among the first to third reflection mirrors, a significant difference can be prevented from being generated in the length of optical path in the longitudinal middle portion of the reflection mirror, thereby preventing the degradation of beam spot property.

As described above, in the image forming apparatus 100, the holder 52, serving as the holding member, holds the third reflection mirror 46 in a forcibly bent state by pressing the third reflection mirror 46 with the leaf springs 52*b* at positions closer to the respective ends of the holder 52 than the hooks 52*a* while supporting the third reflection mirror 46 with the hooks 52*a*.

In such configuration, by pressing the third reflection mirror 46 with the leaf springs 52*b* at positions closer to the respective ends in the longitudinal direction than the hooks 52*a* serving as the supporting points for forcibly bending the holder 52, the middle portion of the third reflection mirror 46 can be forcibly bent. Further, pressing the longitudinal end portions of the third reflection mirror 46 by the leaf springs 52*b* generates a moment toward the middle portion, thereby allowing the third reflection mirror 46 to be securely held between the leaf springs 52*b* on the end portions of the holder 52.

Further, the holder 52 is configured so that the mirror face of the third reflection mirror 46 is supported by the hooks 52*a* while the back face of the third reflection mirror 46 is pressed by the leaf springs 52*b*. In such configuration, the back face of the third reflection mirror 46 is pressed toward the mirror face thereof by the leaf springs 52*b* at positions closer to the respective end portions in the longitudinal direction than the hooks 52*a*, while the hooks 52*a* serving as the supporting points for forcibly bending the third reflection mirror 46 is pressed against the mirror face of the third reflection mirror 46.

As a result, the middle portion of the third reflection mirror 46 in the longitudinal direction can be forcibly bent from the mirror-face side toward the back-face side of the third reflection mirror 46. Further, such configuration can forcibly bend the third reflection mirror 46 by a pressure generated between the holder 51 and the third reflection mirror 46. Accordingly, commercially available products, such as leaf springs or coil springs, having a relatively simple structure can be used as the pressing members.

In the image forming apparatus 100, the pushing unit including the curvature-adjustment pulse motor pushes the third reflection mirror 46 at positions closer to the longitudinal middle portion of the holder 52 than the hooks 52*a*. In such configuration, the pushing unit pushes the middle portion of the third reflection mirror 46, which is forcibly bent by the holder 52, in a direction opposite the forcibly bent direction. Thus, the third reflection mirror 46 can be bent in the direction opposite the forcibly bent direction while using the hooks 52*a* as the supporting points.

The pushing unit also pushes the third reflection mirror 46 from the back side of the third reflection mirror 46. In such configuration, without contacting the mirror face of the third reflection mirror 46, the pushing unit can push the third reflection mirror 46, thereby preventing the mirror face from being damaged at a contact portion between the mirror face and the pushing unit.

Alternatively, as described above, the pushing unit may be the adjustment screw 165. By pressing the tip of the adjustment screw 165 against the back face of the third reflection mirror 46, the rotation direction and amount of the adjustment screw 165 is changeable to adjust the amount at which the pushing unit pushes the third reflection mirror 46. Such configuration can provide a relatively simple configuration, thereby reducing cost compared to a configuration in which the pushing unit is a pulse motor or the like. Such configuration can also change the resolution power of curvature adjustment only by adjusting the pitch of the adjustment screw 165.

Alternatively, in the image forming apparatus 100, the pushing unit may be the cam member 265. In such configuration, by pressing the cam member 265 against the back face of the third reflection mirror 46, the rotation angle of the cam member 265 is changeable to adjust the pushing amount of the pushing unit against the third reflection mirror 46. Further, the pushing amount of the pushing unit is adjustable by rotating the cam shaft, to which the cam member 265 is disposed, in the direction perpendicular to the direction in which the pushing unit pushes the third reflection mirror 46.

As described above, in the image forming apparatus in which the housing of the optical writing unit faces the backface side of the third reflection mirror, such cam member may be used as the pushing unit. Use of such cam member allows an operator to smoothly perform such curvature adjustment from the direction perpendicular to the direction in which the pushing unit pushes the third reflection mirror, thereby improving the efficiency of curvature adjustment.

Alternatively, in the image forming apparatus 100, the third reflection mirror 46 may be pushed from a direction inclined to the direction perpendicular to the mirror face of the third reflection mirror 46. Such configuration can improve the resolution power of curvature adjustment compared to the configuration in which the third reflection mirror 46 is pushed from the direction perpendicular to the mirror face of the third reflection mirror 46.

As described above, for the holder 52, the hooks 52a may be integrally formed with the main body of the holder 52, thereby reducing cost compared to a configuration in which a separate support member is provided with such main body.

Further, the hooks 52a are positioned outside the effective range A1 of light beam, serving as writing light, in the main scanning direction. As described above, such configuration can prevent image quality from being degraded even if the hooks 52a are disposed on the optical path of the light beam by largely inclining the third reflection mirror 46 with the inclination correction device or by largely bending the third reflection mirror 46 with the curvature correction device.

In the image forming apparatus 100, the curvature correction device bends the third reflection mirror 46 that forms a largest obtuse angle between an incident light beam and a reflected light beam among the first to third reflection mirrors. Such configuration can prevent a significant difference from being generated in the length of optical path in the middle portion of such reflection mirrors in the longitudinal direction, thereby preventing the degradation of beam spot property.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Examples and embodiments being thus described, it should be apparent to one skilled in the art after reading this disclosure that the examples and embodiments may be varied in many ways. Such variations are not to be regarded as a departure from the spirit and scope of the present invention, and such modifications are not excluded from the scope of the following claims.

What is claimed is:

1. A curvature correction device used in an optical scanning unit that optically scans a scan target with a light beam, the optical scanning unit including a light beam emitter configured to emit the light beam, a deflection unit configured to deflect the light beam in a main scanning direction of the optical scanning unit, and a reflection mirror configured to reflect the light beam, the curvature correction device comprising:
   a holder configured to hold the reflection mirror in a state in which the reflection mirror is forcibly bent in a first direction; and
   a first pushing unit configured to push the reflection mirror held by the holder to bend the reflection mirror in a second direction opposite the first direction in which the reflection mirror is forcibly bent by the holder;
   a second pushing unit configured to directly push an end portion of the reflection mirror to adjust an inclination of the reflection mirror,
   the curvature correction device being configured to correct the curvature of the main scanning line on the surface of the scan target by adjusting an amount at which the first pushing unit pushes the reflection mirror, and the holder including a stiffness relatively larger than a stiffness of the reflection mirror, wherein the holder includes a support member extending from the holder and configured to directly support the reflection mirror and a pressing member configured to press the reflection mirror, the holder being configured to hold the reflection mirror in the forcibly bent state by pressing the reflection mirror with the pressing member at a position relatively closer to each end in a longitudinal direction of the reflection mirror than the support member, while supporting the reflection mirror with the support member at each end portion in the longitudinal direction of the reflection mirror, the reflection mirror includes a mirror face and a back face, and wherein the holder is configured so that the support member supports and is in surface contact with the mirror face of the reflection mirror while the pressing member presses the reflection mirror from a side of the back face of the reflection mirror, the first pushing unit is configured to push the reflection mirror at a position relatively closer to a middle portion in the longitudinal direction of the reflection mirror than the support member supporting the reflection mirror at the each end portion of the longitudinal direction of the reflection mirror, the first pushing unit is configured to push the reflection mirror from a side of a back face of the reflection mirror, and the second pushing unit pushes in a direction parallel to a pushing direction of the first pushing unit.

2. The curvature correction device according to claim 1, wherein the first pushing unit includes at least one adjustment screw, and wherein an amount at which the pushing unit is pushed against the reflection mirror is adjustable by pressing a tip of the at least one adjustment screw against a back face of the reflection mirror and adjusting a rotation direction and amount of the at least one adjustment screw.

3. The curvature correction device according to claim 1, wherein the first pushing unit includes a cam member, and wherein an amount at which the first pushing unit is pushed against the reflection mirror is adjustable by pressing the cam member against a back face of the reflection mirror and adjusting a rotation angle of the cam member.

4. The curvature correction device according to claim 1, wherein the first pushing unit is configured to push the reflection mirror from a direction inclined relative to a direction perpendicular to the mirror face of the reflection mirror.

5. The curvature correction device according to claim 1, wherein the holder further includes a main body, integrally formed with the support member.

6. The curvature correction device according to claim 1, wherein the support member is embodied as a hook extending from the holder that engages the mirror face of the reflection mirror.

7. The curvature correction device according to claim 1, wherein the pressing member is embodied as a resilient member disposed between the holder and the back face of the reflection mirror.

8. An optical scanning unit to optically scan a scan target with a light beam, the optical scanning unit comprising:
a light beam emitter configured to emit the light beam;
a deflector configured to deflect the light beam emitted from the light beam emitter in a main scanning direction of the optical scanning unit;
a reflection mirror configured to reflect the light beam; and a curvature correction device configured to correct a curvature of a main scanning line on a surface of the scan target, the curvature correction device including, a holder configured to hold the reflection mirror in a state in which the reflection mirror is forcibly bent in a first direction, and a pushing unit configured to push the reflection mirror held by the holder to bend the reflection mirror in a second direction, opposite the first direction in which the reflection mirror is forcibly bent by the holder, the curvature correction device being configured to correct the curvature of the main scanning line on a surface of the scan target by adjusting an amount at which the pushing unit pushes the reflection mirror, and the holder including a stiffness relatively larger than a stiffness of the reflection mirror, wherein the holder includes a support member integrally formed with the holder and configured to support the reflection mirror and a pressing member configured to press the reflection mirror, the holder being configured to hold the reflection mirror in the forcibly bent state by pressing the reflection mirror with the pressing member at a position relatively closer to each end in a longitudinal direction of the reflection mirror than the support member, while supporting the reflection mirror with the support member at each end portion in the longitudinal direction of the reflection mirror, and the reflection mirror includes a mirror face and a back face, and wherein the holder is configured so that the support member supports and is in surface contact with the mirror face of the reflection mirror while the pressing member presses the reflection mirror from a side of the back face of the reflection mirror.

9. The optical scanning unit according to claim 8, wherein the support member of the holder is disposed outside an effective range of the light beam in the main scanning direction.

10. The optical scanning unit according to claim 8, wherein the reflection mirror includes a plurality of reflection mirrors, wherein the plurality of reflection mirrors are configured to reflect the light beam to optically scan the scan target, and wherein the curvature correction device is configured to bend one reflection mirror forming a largest obtuse angle between the light beam incident thereto and the light beam reflected thereby among the plurality of reflection mirrors.

11. The optical scanning unit according to claim 8, wherein the light beam emitter includes a plurality of light beam emitters, the plurality of light beam emitters being configured to emit light beams to optically scan separate scan targets, wherein the reflection mirror includes a plurality of reflection mirrors, the plurality of reflection mirrors separately corresponding to the plurality of light beam emitters, wherein the curvature correction device includes a plurality of curvature correction devices, and wherein a number of the plurality of curvature correction devices is at most equal to the number of the plurality of light beam emitters.

12. The optical scanning unit according to claim 11, wherein the number of the plurality of curvature correction devices is either equal to or smaller than by one, the number of the plurality of light beam emitters.

13. An image forming apparatus, comprising:
a latent image bearing member configured to bear a latent image;

an optical scanning unit configured to optically scan a surface of the latent image bearing member with a light beam to form the latent image on the surface of the latent image bearing member; and a developing device configured to develop the latent image on the latent image bearing member, the optical scanning unit including, a light beam emitter configured to emit the light beam, a deflector configured to deflect the light beam emitted from the light beam emitter in a main scanning direction of the optical scanning unit, a reflection mirror configured to reflect the light beam, and a curvature correction device configured to correct a curvature of a main scanning line on the surface of the latent image bearing member, the curvature correction device including, a holder configured to hold the reflection mirror in a state in which the reflection mirror is forcibly bent in a first direction, and a pushing unit configured to push the reflection mirror held by the holder to bend the reflection mirror in a second direction opposite the first direction in which the reflection mirror is forcibly bent by the holder, the curvature correction device being configured to correct the curvature of the main scanning line on the surface of the latent image bearing member by adjusting an amount at which the pushing unit pushes the reflection mirror, and the holder including a stiffness relatively larger than a stiffness of the reflection mirror, wherein the holder includes a support member integrally formed with the holder and configured to support the reflection mirror and a pressing member configured to press the reflection mirror, the holder being configured to hold the reflection mirror in the forcibly bent state by pressing the reflection mirror with the pressing member at a position relatively closer to each end in a longitudinal direction of the reflection mirror than the support member, while supporting the reflection mirror with the support member at each end portion in the longitudinal direction of the reflection mirror, and the reflection mirror includes a mirror face and a back face, and wherein the holder is configured so that the support member supports and is in surface contact with the mirror face of the reflection mirror while the pressing member presses the reflection mirror from a side of the back face of the reflection mirror.

14. The image forming apparatus of claim 13, wherein the reflection mirror of the optical scanning unit includes a plurality of reflection mirrors, wherein the plurality of reflection mirrors are configured to reflect the light beam to optically scan the scan target, and wherein the curvature correction device of the optical scanning unit is configured to bend one reflection mirror forming a largest obtuse angle between the light beam incident thereto and the light beam reflected thereby among the plurality of reflection mirrors.

15. The image forming apparatus of claim 13, wherein the light beam emitter of the optical scanning unit includes a plurality of light beam emitters, the plurality of light beam emitters being configured to emit light beams to optically scan separate scan targets, wherein the reflection mirror of the optical scanning unit includes a plurality of reflection mirrors, the plurality of reflection mirrors separately corresponding to the plurality of light beam emitters, wherein the curvature correction device of the optical scanning unit includes a plurality of curvature correction devices, and wherein a number of the plurality of curvature correction devices is at most equal to the number of the plurality of light beam emitters.

16. The image forming apparatus of claim 15, wherein the number of the plurality of curvature correction devices is either equal to or smaller than by one, the number of the plurality of light beam emitters.

* * * * *